United States Patent
Sakamoto et al.

(10) Patent No.: US 9,523,809 B2
(45) Date of Patent: Dec. 20, 2016

(54) LIGHT EMITTING APPARATUS

(71) Applicant: S.K.G. CO., LTD., Aichi (JP)

(72) Inventors: Mitsuhide Sakamoto, Tokyo (JP); Toru Funabashi, Saitama (JP)

(73) Assignee: S.K.G. CO., LTD., Aichi (JP)

( * ) Notice: Subject to any disclaimer, the term of this patent is extended or adjusted under 35 U.S.C. 154(b) by 197 days.

(21) Appl. No.: 14/009,889

(22) PCT Filed: Feb. 27, 2013

(86) PCT No.: PCT/JP2013/055091
§ 371 (c)(1),
(2) Date: Oct. 4, 2013

(87) PCT Pub. No.: WO2013/129461
PCT Pub. Date: Sep. 6, 2013

(65) Prior Publication Data
US 2014/0063847 A1 Mar. 6, 2014

(30) Foreign Application Priority Data

Mar. 2, 2012 (JP) .................................. 2012-046777

(51) Int. Cl.
*G02B 6/00* (2006.01)
*F21V 8/00* (2006.01)
*F21Y 101/00* (2016.01)

(52) U.S. Cl.
CPC ............... *G02B 6/0031* (2013.01); *F21K 9/61* (2016.08); *G02B 6/0051* (2013.01);
(Continued)

(58) Field of Classification Search
CPC ... G02B 6/0031; G02B 6/0051; G02B 6/0053; G02B 6/0073; F21K 9/52
See application file for complete search history.

(56) References Cited

U.S. PATENT DOCUMENTS

2004/0145914 A1* 7/2004 Yu .................. G02B 6/0016
362/558
2005/0001952 A1* 1/2005 Han .................. G02B 6/0021
349/65
(Continued)

FOREIGN PATENT DOCUMENTS

CN 101960205 1/2011
CN 102227586 10/2011
(Continued)

OTHER PUBLICATIONS

International Search Report with English language translation dated Apr. 16, 2013.
Taiwan Office Action dated Mar. 25, 2015.

*Primary Examiner* — Andrew Coughlin
(74) *Attorney, Agent, or Firm* — Greenblum & Bernstein, P.L.C.

(57) ABSTRACT

A light emitting apparatus in which light of different colors can be irradiated depending on the locations of a light guide member used in the light emitting apparatus and in accordance with the environment of a facility or a user's demand, a light source member includes a plurality of light source members each with one or more light sources, and adjacent light source parts emitting light of different colors with each other. The light guide member includes a recess which is formed between the respective input surfaces through which the light from the corresponding light source parts is input and which has a recess side surface that reflects at least some of the light input through the input surfaces; a plurality of extension parts that respectively guide mainly the light input from the corresponding light source parts through the input surfaces; and a cutout portion formed between the extension parts.

14 Claims, 12 Drawing Sheets

(52) U.S. Cl.
CPC ......... *G02B 6/0068* (2013.01); *G02B 6/0078* (2013.01); *F21K 9/23* (2016.08); *F21Y 2101/00* (2013.01); *G02B 6/009* (2013.01); *G02B 6/0036* (2013.01); *G02B 6/0063* (2013.01); *G02B 6/0088* (2013.01)

(56) References Cited

U.S. PATENT DOCUMENTS

| | | | |
|---|---|---|---|
| 2006/0147151 A1* | 7/2006 | Wanninger et al. | 385/31 |
| 2010/0207933 A1* | 8/2010 | Suzuki | G02B 6/0068 345/214 |
| 2011/0164434 A1* | 7/2011 | Derichs | G02B 6/0011 362/612 |
| 2011/0205451 A1* | 8/2011 | Yoshikawa | G02B 6/0046 348/739 |

FOREIGN PATENT DOCUMENTS

| | | |
|---|---|---|
| JP | 3121625 | 5/2006 |
| JP | 3124753 | 8/2006 |
| JP | 2010-102188 | 5/2010 |
| JP | 2010-257846 | 11/2010 |
| JP | 2010-257847 | 11/2010 |
| JP | 2011-003367 | 1/2011 |
| JP | 2011-029027 | 2/2011 |
| JP | 2011-175737 | 9/2011 |
| JP | 2011-228167 | 11/2011 |
| JP | 2011-228168 | 11/2011 |
| JP | 2011-249300 | 12/2011 |
| WO | 2011/148420 | 12/2011 |

\* cited by examiner

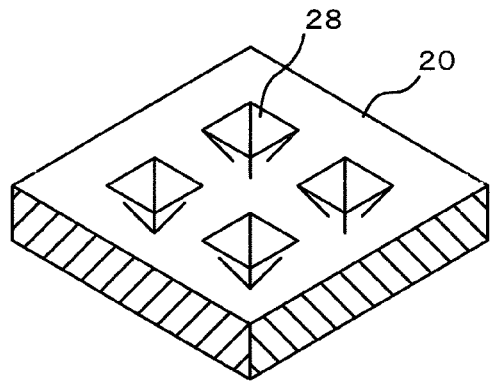
FIG. 4A
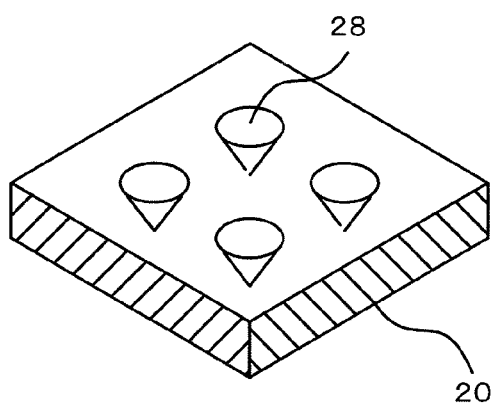
FIG. 4B
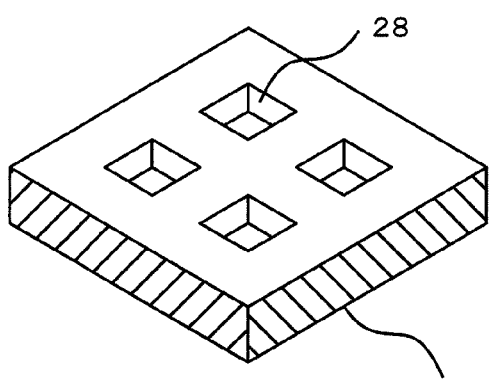
FIG. 4C
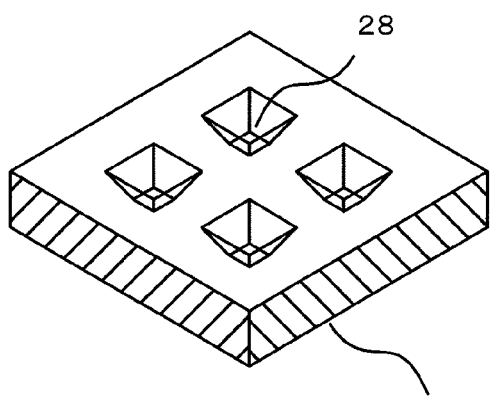
FIG. 4D
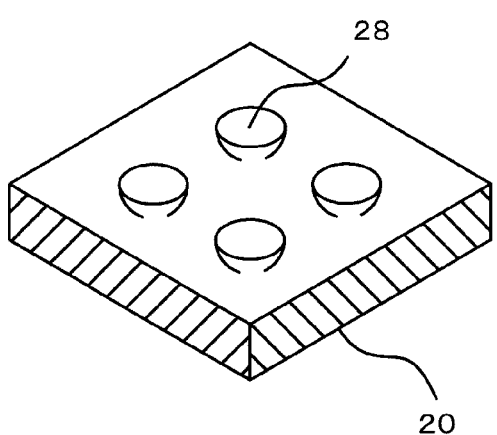
FIG. 4E
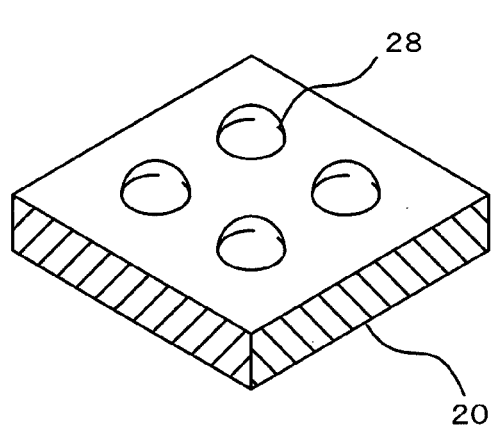
FIG. 4F
FIG. 4

LIGHT EMITTING APPARATUS

TECHNICAL FIELD

The present invention relates to a light emitting apparatus including a light guide member.

BACKGROUND ART

A disclosed apparatus includes a light source part that emits light under electric power; a casing part housing the light source part; and a light guide member protruding from the casing part and causing the light input from the light source part through input surfaces to be derived out of branched output surfaces (Patent Document 1).

A disclosed apparatus includes a light guide part having an assembly of light guide plates for deriving light input through input surfaces out of a recessed or convex pattern formed on main surfaces as diffused light; a casing part adjoining the light guide part and fitted with a light source part for introducing light into the light guide plates through the input surfaces and with a power source unit for supplying predetermined drive electric power to the light source part; and a holder part engaging the light guide plates of the light guide part and detachably holding at least the light guide plates onto the casing part (Patent Documents 2 and 3).

An apparatus that has been disclosed includes a light guide part having a light guide plate branched into a plurality of parts with a diffused light deriving pattern formed on at least one surface thereof; a light source part adjoining the light guide part and having light sources for introducing light into the light guide plate from a lower surface thereof toward an opposite upper surface; a heat dissipating part abutting on the back surface of the light source part for absorbing and dissipating heat generated by the light source part; a feeding part electrically connected to the light source part for supplying electric power to the light source part; and a holder part abutting on one end of the light guide part and detachably holding at least the light guide part onto the heat dissipating part (Patent Document 4).

An apparatus that has been disclosed includes a plurality of light guide plates with reflecting dots formed by the pressing of an ultrasonic processing horn correspondingly to the shape of processing dots arranged in a matrix on the horn; LED light sources for causing LED light to enter the light guide plates; and a holder member holding the LED light sources. The plurality of light guide plates are formed such that main surfaces on which the reflecting dots are formed have different angles (Patent Document 5).

An apparatus for manufacturing a light guide member used in light emitting apparatuses employing such light guide members includes a light guide plate base member fixing part for fixing a light guide plate base member, as a base member to be formed into a light guide plate; an ultrasonic processing horn for forming recesses by partially melting main surfaces of the light guide plate base member fixed on the light guide plate base member fixing part by ultrasonic vibrations; a moving mechanism for moving the ultrasonic processing horn along the main surfaces of the light guide plate base member and downward toward the main surface of the light guide plate base member; and a control unit for controlling the ultrasonic processing horn and the moving mechanism so that, after the recesses are formed to have a predetermined depth in the light guide plate base member, the position of the ultrasonic processing horn is maintained while application of ultrasound to the ultrasonic processing horn is continued (Patent Document 6).

As a method for manufacturing a light guide member, a method for manufacturing a light guide plate for inputting light through side surfaces of a light guide plate board and deriving the light out of main surfaces thereof has been disclosed. The manufacturing method includes arranging processing dots on a rectangular end surface of an ultrasonic processing horn in a matrix; forming reflecting dots corresponding to the processing dots of the end surface on one main surface of the light guide plate board by pressing the end surface of the ultrasonic processing horn onto the one main surface of the light guide plate board; and forming the reflecting dots in a predetermined area on the one main surface of the light guide plate board by repeating the formation of the reflecting dots while moving the ultrasonic processing horn relative to the light guide plate board on the plane of the one main surface. The reflecting dots are formed on both of opposite main surfaces of the light guide plate board such that the reflecting dots are not aligned between the opposite faces of the opposite main surfaces (Patent Document 8).

The entire contents of the prior art documents are incorporated herein by reference.

PATENT DOCUMENTS

Patent Document 1: WO2011/148420
Patent Document 2: JP-A-2011-228168
Patent Document 3: JP-A-2011-228167
Patent Document 4: JP-A-2011-175737
Patent Document 5: JP-A-2011-3367
Patent Document 6: JP-A-2011-29027
Patent Document 7: JP-A-2010-257847
Patent Document 8: JP-A-2010-257846

SUMMARY OF THE INVENTION

Problem to be Solved by the Invention

An object of the present invention is to provide a light emitting apparatus including a light guide member in which light of different colors can be irradiated depending on the locations of the light guide member in accordance with the environment of a facility or a user's demand.

Solution to the Problem

The present invention adopts the following means for achieving the above object.

A light emitting apparatus according to the present invention includes a light source member having a plurality of light source parts each with one or more light sources that emit light under external power supply; and a light guide member having input surfaces through which the light from the light source member is input and other end surfaces through which the input light is output. Each of the adjacent light source parts of the light source member emits light of different colors. The light guide member includes a recess formed between the respective input surfaces through which the light from the corresponding light source parts is input and having a recess side surface that reflects at least some of the light input through the input surfaces; a plurality of extension parts that mainly guide the light input through the input surfaces from the corresponding light source parts respectively; and a cutout portion formed between the extension parts.

Effects of the Invention

In the light emitting apparatus according to the present invention, when the light from the light source parts emitting light of different colors is input into the integral light guide member, specific colors of light can be output at predetermined portions without the colors being mixed within the light guide member.

BRIEF DESCRIPTION OF DRAWINGS

FIG. 4A illustrates a variation of the diffusing dots 28;
FIG. 4B illustrates a variation of the diffusing dots 28;
FIG. 4C illustrates a variation of the diffusing dots 28;
FIG. 4D illustrates a variation of the diffusing dots 28;
FIG. 4E illustrates a variation of the diffusing dots 28;
FIG. 4F illustrates a variation of the diffusing dots 28.

MODE FOR CARRYING OUT THE INVENTION

Embodiments of the light emitting apparatus according to the present invention will be described with reference to the drawings. The following embodiments and drawings illustrate some of the embodiments of the present invention and are not intended to limit the present invention. Various modifications can be made within the scope of the present invention.

(First Embodiment)

Figure 1:
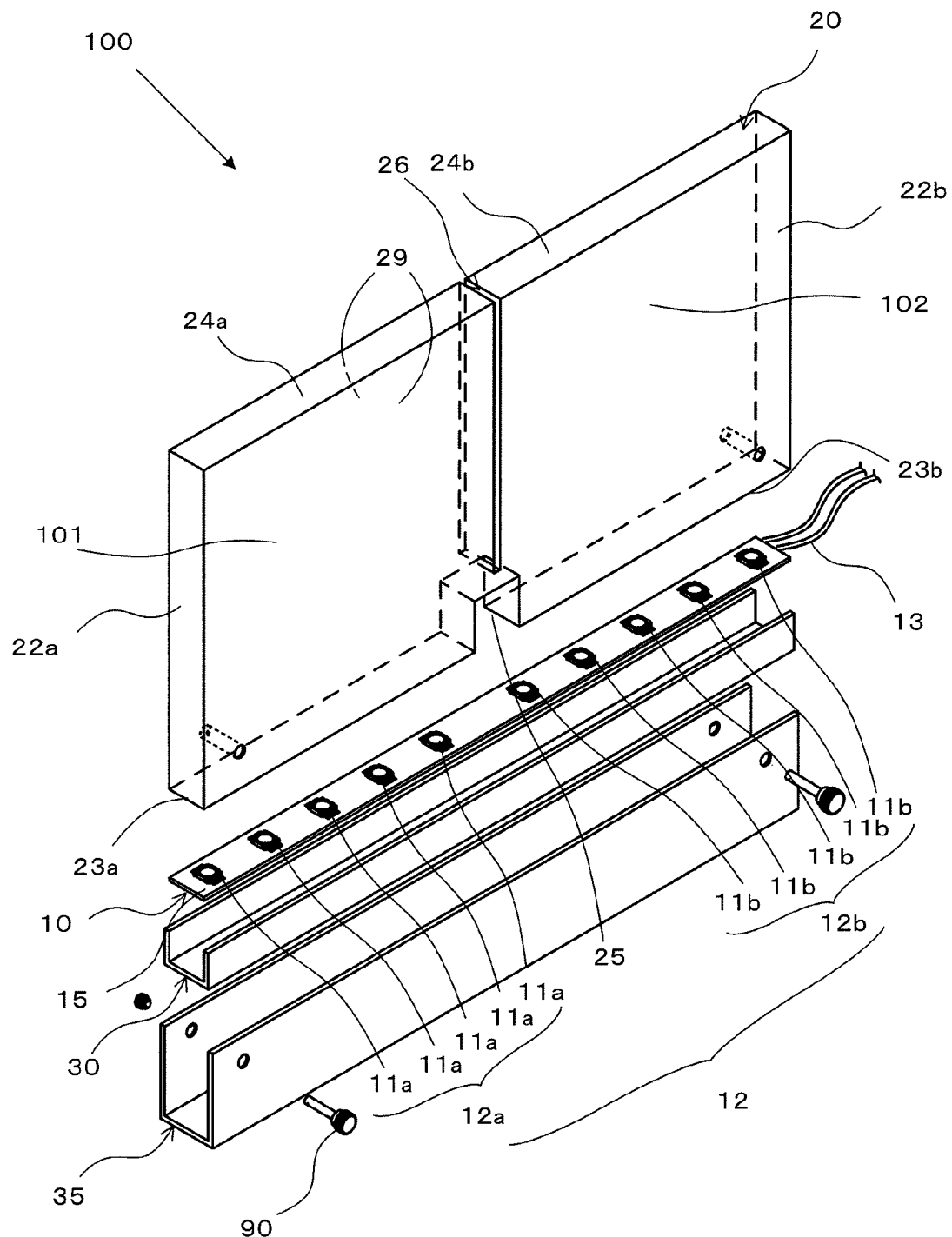
FIG. 1 is an exploded perspective view of a light emitting apparatus 100 according to a first embodiment.
Figure 2:
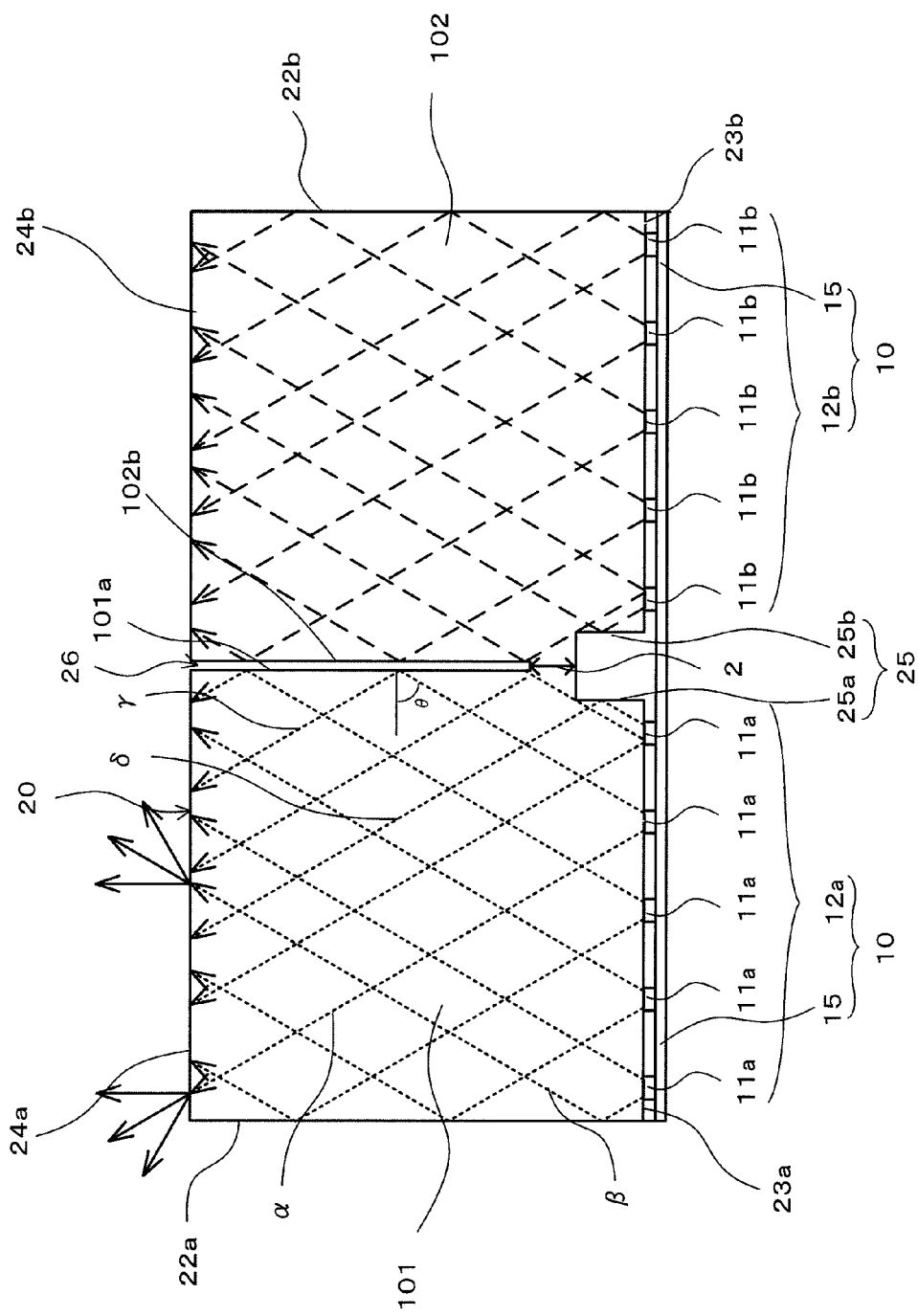
FIG. 2 schematically illustrates how light propagates when LEDs with the diffusion angle of 30° (directivity angle 60°) are used as light sources.

A light emitting apparatus 100 according to the first embodiment will be described with reference to FIGS. 1 and 2. FIG. 1 is a perspective view of the light emitting apparatus 100 according to the first embodiment. FIG. 2 schematically illustrates how light propagates when LEDs with the diffusion angle of 30° are used as light sources. As shown in FIG. 1, the light emitting apparatus 100 according to the first embodiment is mainly provided with a light source member 10, a light guide member 20, a C-shaped steel 30, and a holder member 35, and the light source member 10 and the light guide member 20 are attached to the C-shaped steel 30 and a holder member 35.

As shown in FIG. 1, the light source member 10 is provided with a left-side light source part 12a and a right-side light source part 12b that output wavelength of 20 nm to 1 mm under supplied power, and with a board 15 to which the light source parts 12 are attached. The left-side light source part 12a has a plurality of light sources 11a, and the right-side light source part 12b has a plurality of light sources 11b. According to the first embodiment, light-emitting diodes are used as the light sources 11a and 11b. As the light source member 10, an organic light-emitting diode, a fluorescent tube, a cold cathode tube, a laser oscillator and the like maybe used. The color of light when using a light source that emits visible light is not limited, and may include white, red, orange, yellow, green, blue, indigo, or violet, or various combinations thereof. The left-side light source part 12a is formed of a group of light sources that output the same wavelength or emit the same color. On the other hand, the adjacent right-side light source part 12b is formed of a group of light sources of a different wavelength or light from the left-side light source part 12a. According to the first embodiment, the LEDs emit visible light with the diffusion angle of 30° (directivity angle 60°). As shown in FIG. 1, the left-side light source part 12a includes four light sources 11a of LEDs emitting white light, while the right-side light source part 12b includes four light sources 11b of LEDs emitting orange light. The light sources 11a and 11b that output such visible light may be effectively used when the apparatus is used as a lighting device. To the board 15, power supply cords 13 for supplying electricity from a power source (not shown) are attached near the end of the light source parts 12. The electric power is supplied from the power supply cords 13 to the light sources 11a or the light sources 11b through a power supply unit (not shown). The power supply unit is a unit for adapting the externally supplied electric power to the rating of the light sources 11, which performs voltage stepping-down, rectification into a constant DC current, and pulse modulation and noise removal after rectification, for example, and then supplies drive electric power to the light source parts 12. The power supply unit includes a transformer, a rectifier, a capacitor and the like, for example.

As shown in FIG. 1, the light guide member 20 guides the light input from the light source parts 12 and outputs the light through a desired surface. Examples of the material of the light guide member 20 include methacrylic resins such as methyl methacrylate and ethyl methacrylate, acrylic resins such as methyl acrylate and ethyl acrylate, polycarbonate, and polyethylene. The material is not particularly limited as long as the material has high transmittance. Further, the light guide member 20 may contain a fine-particulate diffuser for diffusing visible light, or may include a resin plate coated with or containing a fluorescent agent that emits fluorescence upon visible or ultraviolet light irradiation. By adopting such a configuration, light can be emitted within the light guide member 20, so that the difference in color of the light that passes through the light guide member 20 can be distinguished by viewing the light guide member 20. According to the first embodiment, the light guide member 20 is, as shown in FIG. 1, a single light guide plate of methacrylic resin with main surfaces 29 and side surfaces. Of the side surfaces, the side surfaces facing the left-side light source part 12a and the right-side light source part 12b form a left-side input surface 23a and a right-side input surface 23b, respectively, through which the corresponding light from the light source parts 12 is input. The side surfaces on the opposite side from the left-side input surface 23a and the right-side input surface 23b form a left-side output surface 24a and a right-side output surface 24b, respectively, that are separated by a cutout portion 26 at the center. The light input through the left-side input surface 23a and the right-side input surface 23b exits through the left-side output surface 24a and the right-side output surface 24b, respectively. The left-side output surface 24a and the right-side output surface 24b are formed in a coarse surface so that the light received through the left-side input surface 23a and the right-side input surface 23b is diffused as it is output. Further, on both sides of the light guide member 20, a left-side outer surface 22a and a right-side outer surface 22b are formed. On the left-side input surface 23a and the right-side input surface 23b, a left-side extension part 101 and a right-side extension part 102 are formed respectively, which are separated by the cutout portion 26. On the opposite side from the cutout portion 26, a recess 25 is formed. Thus, the left-side extension part 101 and the right-side extension part 102 extend toward the opposite side from the left-side input surface 23a and the right-side input surface 23b, respectively.

The C-shaped steel 30 is a member in which mainly the board 15 is disposed, with the function of mainly dissipating the heat from the light source parts 12. The holder member 35 is an elongated member with U-shaped cross section for holding the C-shaped steel and the light guide member 20. In the holder member 35, after the C-shaped steel is disposed, the light guide member 20 is fixed by bolts 90, thus forming the light emitting apparatus 100.

Next, optical characteristics regarding how the light input into the light guide member 20 from the light source member 10 is diffused around will be described with reference to FIG. 2. The white light irradiated from the light sources 11a is introduced through the left-side input surface 23a into the left-side extension part 101 while being diffused in an area of 30° with respect to the vertical direction, as shown in FIG. 2. The light among the introduced light that has reached the left-side output surface 24a directly (such as line α) is diffused by the coarse surface of the left-side output surface 24a as the light is output, irradiating surrounding areas. The light that has reached the left-side outer surface 22a (such as line β) is reflected by the left-side outer surface 22a and then reaches the left-side output surface 24a, where the light is diffused by the coarse surface of the left-side output surface 24a to irradiate the surrounding areas. Further, the light that has reached the right-side surface 101a of the left-side extension part 101 (such as line γ) is reflected by the right-side surface 101a and then reaches the left-side output surface 24a, where the light is diffused by the coarse surface of the left-side output surface 24a to irradiate the surrounding areas. The light that has reached the recess left-side surface 25a of the recess 25 (such as line δ) is reflected by the recess left-side surface 25a and then reaches the left-side output surface 24a, where the light is diffused by the coarse surface of the left-side output surface 24a to irradiate the surrounding areas. Thus, most of the light irradiated from the light sources 11a travels through the left-side extension part 101, reaches the left-side output surface 24a either directly or after reflected by the left-side outer surface 22a, the right-side surface 101a of the left-side extension part 101, or the recess left-side surface 25a, and is eventually diffused by the left-side output surface 24a as the light is output to irradiate the surrounding areas. Hardly any of the light output from the light sources 11a passes through a section 2 between the bottom surface of the cutout portion 26 and the recess 25. Thus, the entry of the light from the light sources 11a into the right-side extension part 102 can be decreased, so that the white light from the light sources 11a can be derived through the left-side extension part 101 as it is.

Meanwhile, the orange light irradiated from the light sources 11b is guided into the light guide member 20 through the right-side input surface 23b while being diffused in an area of 30° with respect to the vertical direction. According to the same theory as for the light sources 11a, the light that has directly reached the right-side output surface 24b is diffused by the coarse surface of the right-side output surface 24b, irradiating surrounding areas. The light that has reached the right-side outer surface 22b, the left-side surface 102b of the right-side extension part 102, or a recess right-side surface 25b is reflected by the respective side surfaces, and then reaches the right-side output surface 24b, where the light is diffused by the coarse surface of the right-side output surface 24b to irradiate the surrounding areas. Similarly, hardly any of the light output from the light sources 11b passes through the section 2 between the bottom surface of the cutout portion 26 and the recess 25. Thus, the entry of the light from the light sources 11b into the left-side extension part 101 can be decreased, so that the orange light from the light sources 11b can be derived through the right-side extension part 102 as it is.

The relationship between the light source parts 12, the cutout portion 26, and the recess 25 will be described by way of the light sources 11a. Preferably, 70% or more of the light from the light sources 11a is reflected upon reaching the cutout portion 26 or the recess 25. If the reflectance is 70% or less, the light may pass through the right-side surface 101a of the left-side extension part 101 or the recess left-side surface 25a of the recess 25 and enter the right-side extension part 102, where optical mixture may occur such that the intended colors of light cannot be derived. More preferably, the reflectance is 90% or more, and total reflection is even more preferable.

The critical angle for total reflection is determined as follows. When methacrylic resin is used for the light guide member 20, for example, the refraction index of methacrylic resin is approximately 1.49. Accordingly, assuming that the refraction index of air is 1.0, the critical angle is determined as below:

$\sin \theta m/\sin 90° = 1/1.49 = 0.6711.$ $\theta m = 42.1°.$

Accordingly, when a left-side cutout-side surface 26a of the cutout portion 26 or the recess left-side surface 25a of the recess 25 is disposed vertically with respect to the light source member 10, total reflection can occur with the ratio of diffusion of the light sources 11a of not more than 47.9°.

Preferably, the cutout portion 26 and the recess 25 are formed in a relationship such that none of the light from the light source part 12a directly passes through the section 2 between the bottom surface of the cutout portion 26 and the recess 25. By adopting such a configuration, the likelihood of the light entering the adjacent extension part can be decreased.

While the first embodiment has been described with respect to the LEDs that emit visible light, a light source that outputs light with wavelengths different from those of visible light, such as infrared light or ultraviolet light, may be used, as mentioned above. For example, the left-side light source part 12a with the light sources 11a that output near-ultraviolet light and the right-side light source part 12b having the light sources 11b that output far-ultraviolet light maybe used. By adopting such a configuration, the left-side output surface 24a and the right-side output surface 24b can output ultraviolet light of different wavelengths. This is effective when different wavelengths of light are desired to be output based on different plants for hydroponic culture, for example.

Figure 3:
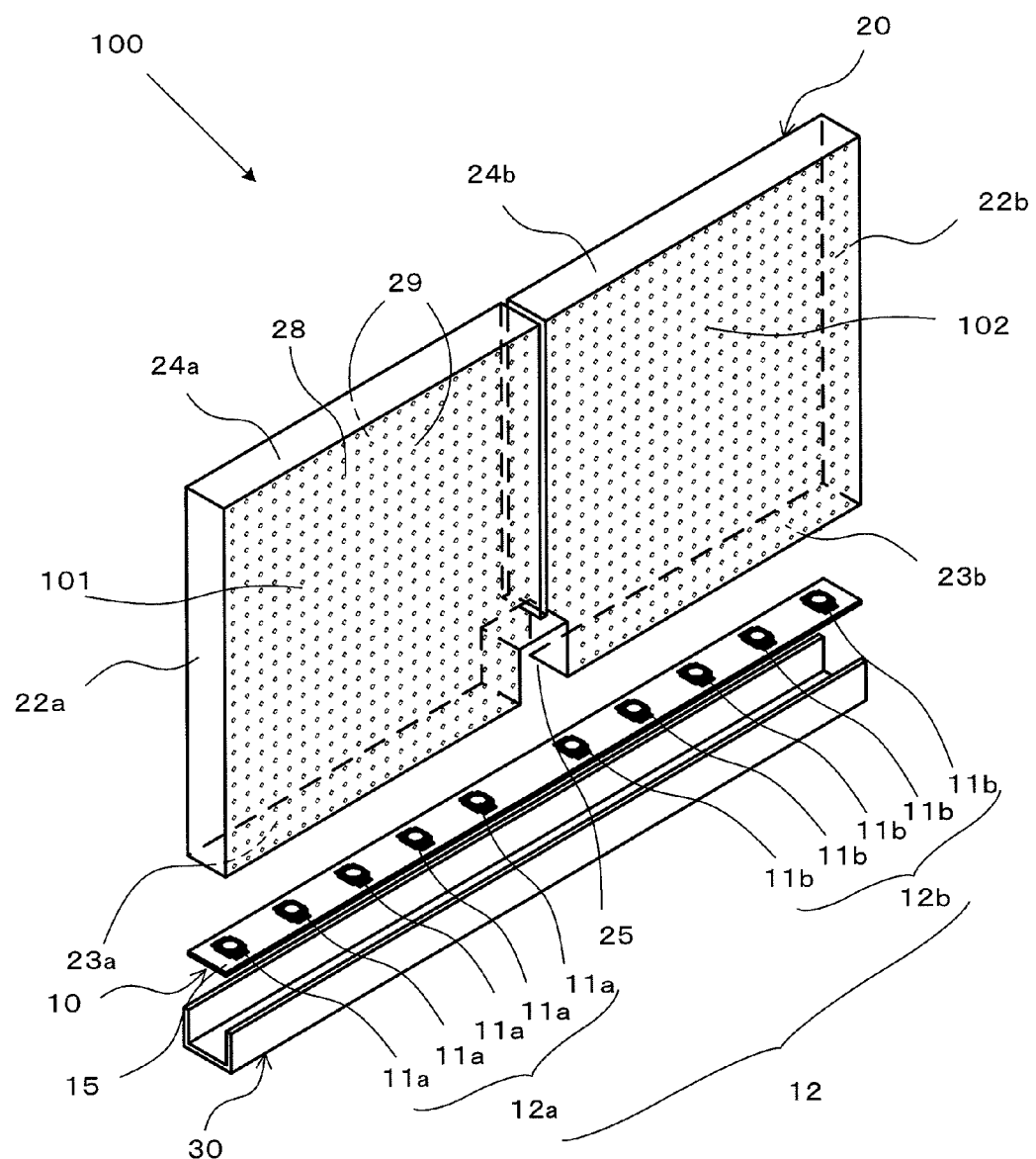
FIG. 3 is an exploded perspective view of the light emitting apparatus according to the first embodiment in which main surfaces have diffusing dots 28 of diffusing recesses.
Figure 5:
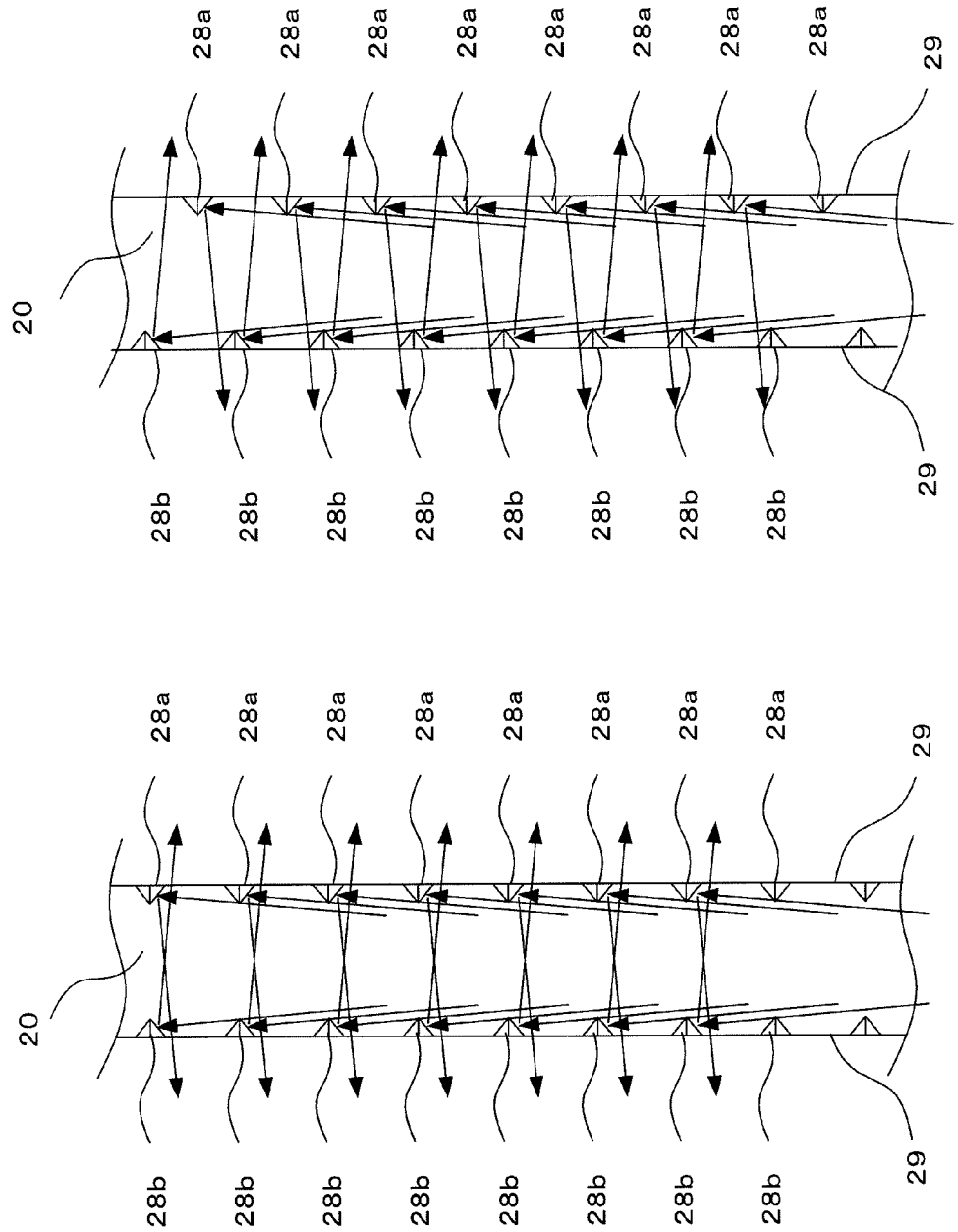
FIG. 5A schematically illustrates how light is diffused in the light guide member 20 having the diffusing dots 28.
FIG. 5B schematically illustrates how light is diffused in the light guide member 20 having the diffusing dots 28.

While according to the first embodiment the light guide member 20 has smooth main surfaces, the present invention is not limited to such embodiment. As shown in FIG. 3, the main surfaces 29 on both sides of the light guide member 20 may have diffusing dots 28 of diffusing recesses or diffusing protrusions to derive the light input through the left-side input surface 23a and the right-side input surface 23b of the light guide member 20 as diffused light. FIG. 3 is a perspective view of the light emitting apparatus 100 in which the main surfaces 29 according to the first embodiment are provided with the diffusing dots 28 of diffusing recesses. FIG. 4 illustrates variations of the diffusing dots 28. FIG. 5 schematically illustrates how the light is diffused in the light guide member 20 with the diffusing dots 28. Preferably, as a form of the diffusing recesses, the diffusing dots 28 of square pyramidal shape with each side of 0.6 mm in length and a depth of 0.4 mm may be formed in a matrix. However, the present invention is not limited to such embodiment. The length of each side of the square pyramidal diffusing dots 28 may range from 0.6 mm to 1.5 mm, and the depth of the pyramidal diffusing dots 28 may range from 0.4 mm to 0.8 mm. The pitch between the adjacent square pyramidal diffusing dots 28 is also not particularly limited and may be selected from about 1.5 mm to about 8.0 mm as needed. Preferably, the pitch may be made between 1.5 mm and 3.0 mm. The size of the individual square pyramidal diffusing dots 28 may be the same or different. For example, the length of the sides of the square pyramidal diffusing dots 28 may be gradually increased or the depth of the square pyramidal diffusing dots 28 maybe gradually increased with increasing distance from the light source parts 12. In this way, the amount of light that is bent can be decreased at positions closer to the light source where the optical intensity is greater, while the amount of light that is bent can be increased with increasing distance from the light source. Thus, apparent uniformity of the brightness of the square pyramidal diffusing dots 28 can be achieved.

The shape and size of the diffusing recesses are not particularly limited, and the diffusing dots 28 having various diffusing recesses may be adopted as needed. Several specific examples are shown in the drawings. FIG. 4A shows square pyramidal diffusing recesses. FIG. 4B shows conical diffusing recesses. FIG. 4C shows quadrangular prism shaped diffusing recesses. FIG. 4D shows square frustum shaped diffusing recesses. FIG. 4E shows hemispherical diffusing recesses. The diffusing recesses need not be dots, and may be grooves instead. The diffusing recesses may be formed by various processing methods, such as ultrasonic processing, thermal processing, laser processing, or cutting processing.

The light input from the light source parts 12 may be derived as diffused light through the diffusing dots 28 of diffusing protrusions on the main surfaces of the light guide member 20. A specific example of the diffusing protrusions is shown in FIG. 4F. FIG. 4F shows hemispherical diffusing protrusions. The diffusing protrusions also need not be dots, but may be in the form of raised lines. The diffusing protrusions may be formed in a raised (convex) shape by screen printing or serigraphy.

Next, how the light is diffused from the main surfaces 29 provided with recessed diffusing dots will be described. FIG. 5A shows the light guide member 20 with diffusing dots 28a and 28b formed respectively on one and the other of the main surfaces 29 at corresponding positions with each other. FIG. 5B shows the light guide member 20 with the diffusing dots 28a and 28b displaced from each other in vertical and horizontal directions by ½ pitch between the main surfaces 29. Regardless of whether the diffusing dots 28a and 28b are disposed at the corresponding positions or displaced by ½ pitch on the main surfaces 29, the light that has passed through the light guide member 20 is diffused around in the same way by the diffusing dots 28. In the case of the ½ pitch displacement, the second diffusing dots 28b are disposed at the centers of the squares formed by the adjacent first diffusing dots 28a. By adopting such a configuration, the second diffusing dots 28b are disposed with equal distances with respect to the adjacent four first diffusing dots 28a, whereby the diffusion ratio of the diffusing dots 28 becomes uniform. Thus, the brightness of the main surfaces 29 as a whole can be made uniform, thereby making it difficult to recognize the difference in brightness due to the diffusing dots 28. It is to be noted that the positional relationship between the first diffusing dots 28a and the second diffusing dots 28b does not necessarily have to be the ½ pitch displacement; the displacement may be ¼ to ¾ the pitch interval of the first diffusing dots 28a. Further, the positional relationship between the first diffusing dots 28a and the second diffusing dots 28b may involve a displacement only in the vertical or horizontal direction.

(Second Embodiment)

Figure 6:
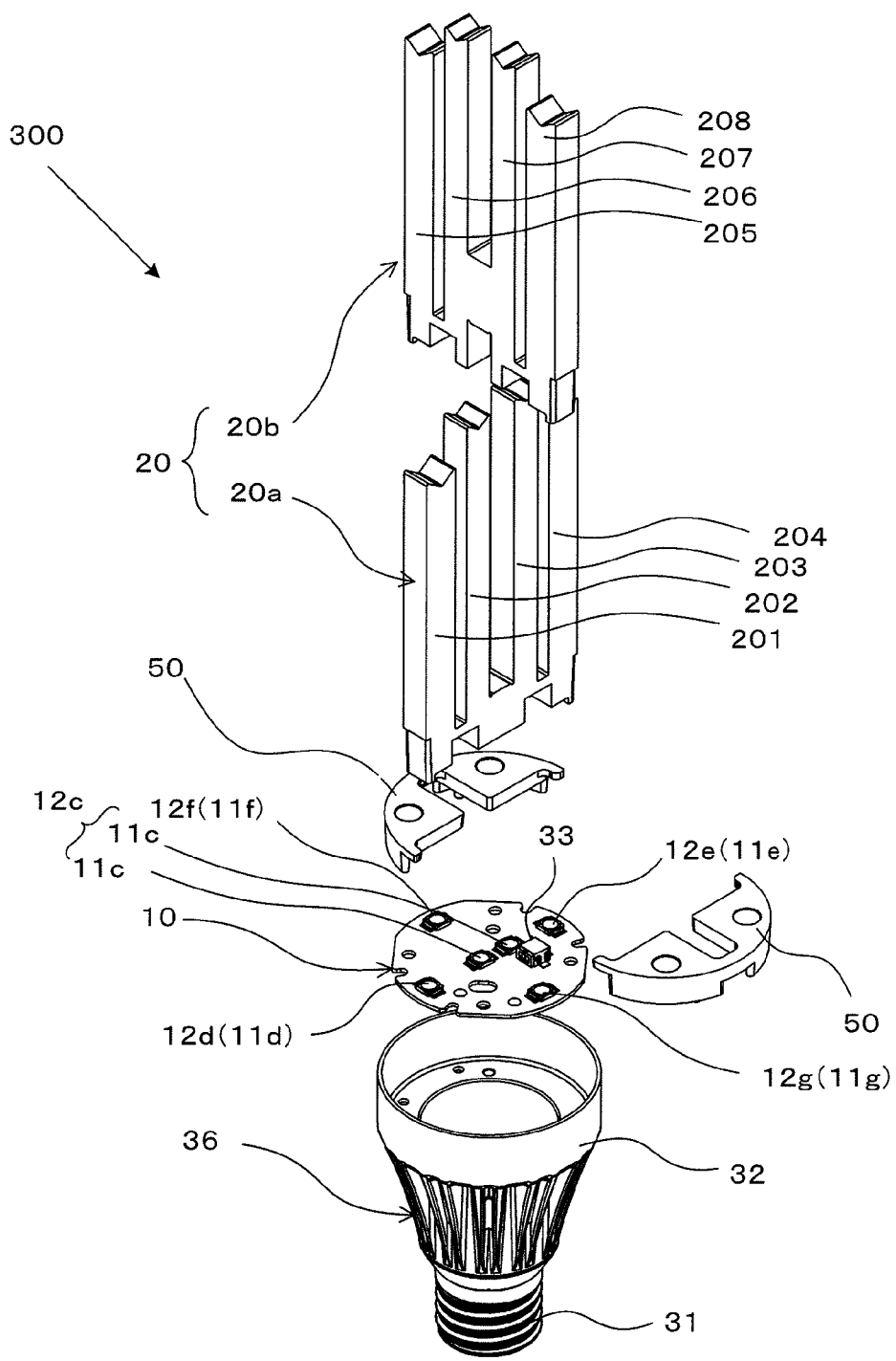
FIG. 6 is an exploded perspective view of a light emitting apparatus 300 according to a second embodiment.
Figure 7:
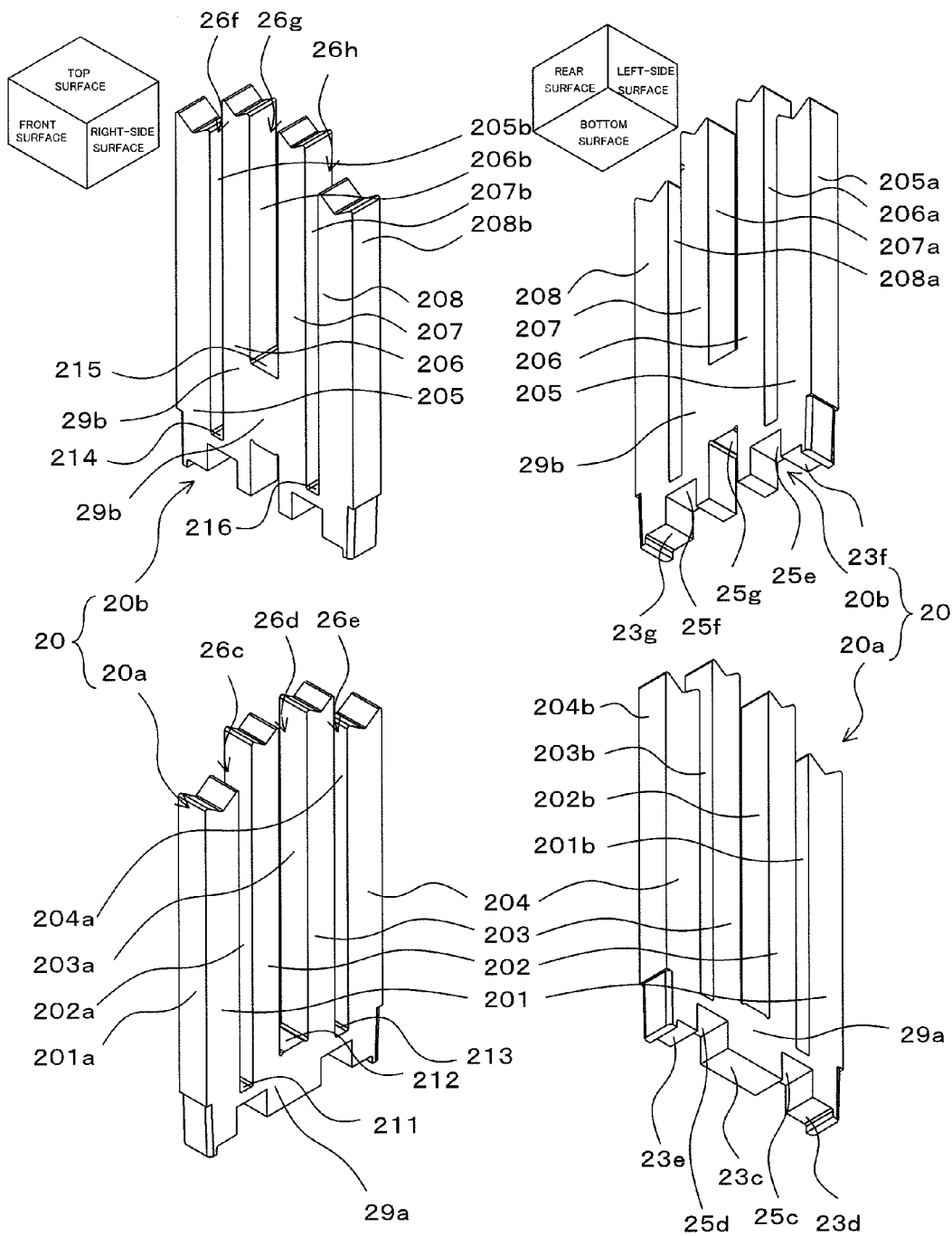
FIG. 7A is an exploded view of the light guide member 20, showing the front, right side, and top views.
FIG. 7B is an exploded view of the light guide member 20, showing the rear, left side, and bottom views.
Figure 8:
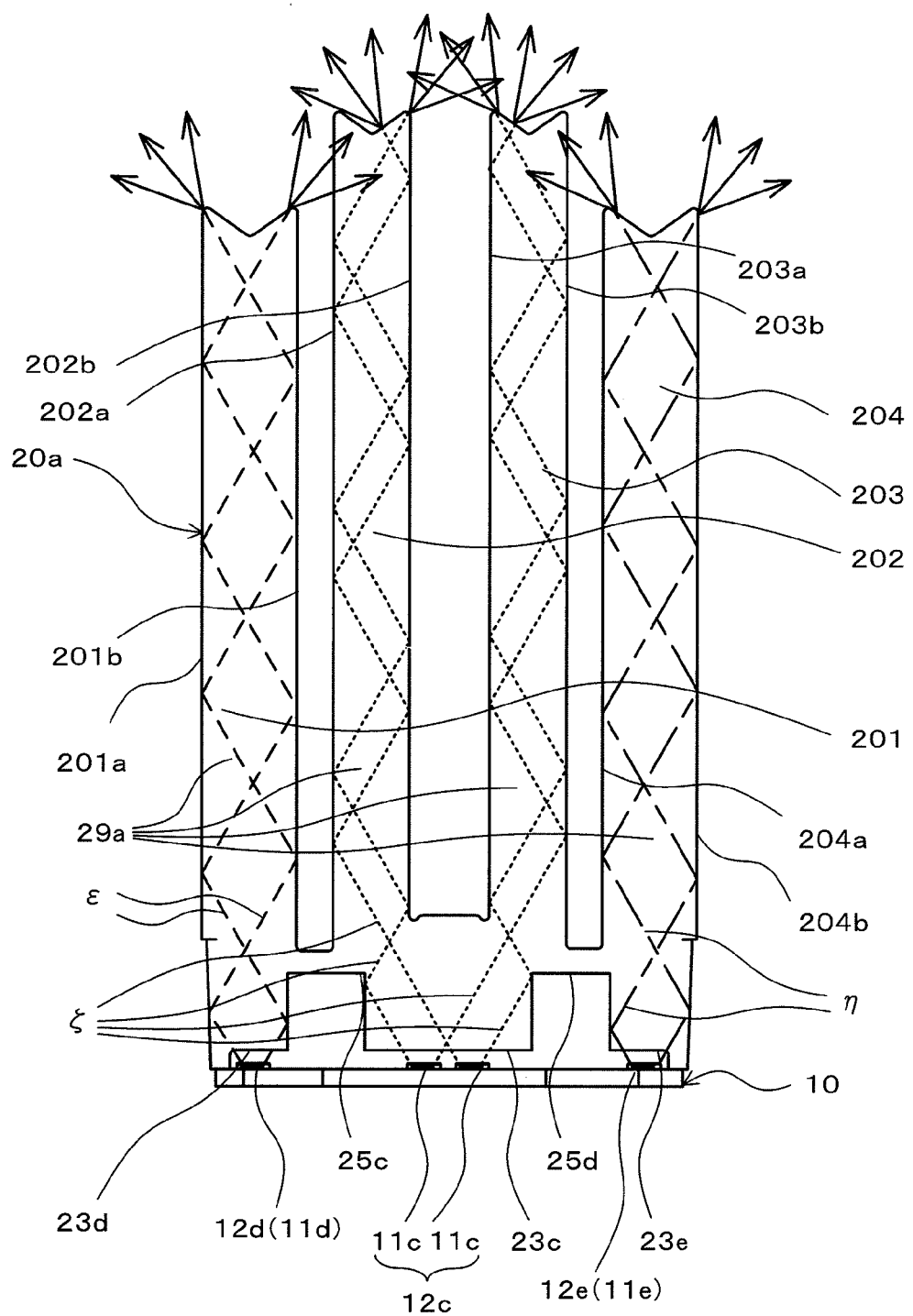
FIG. 8 schematically shows the positional relationship between a first light guide member 20a and a light source member 10 as viewed from the front.

In the following, an LED light bulb as a second embodiment of the light emitting apparatus according to the present invention will be described with reference to the drawings, starting with FIG. 6. FIG. 6 is an exploded perspective view of a light emitting apparatus 300 according to the second embodiment. FIG. 7 shows exploded views of the light guide member 20, FIG. 7A showing the front, right-side, and top views, FIG. 7B showing the rear, left-side, and bottom views. FIG. 8 schematically illustrates the relationship between the light guide member 20 and the light source member 10.

As shown in FIG. 6, the light emitting apparatus 300 according to the second embodiment is provided with the light source member 10, the light guide member 20, and a casing part 36 for holding these two members. The casing part 36 is mainly provided with a metal cap 31 and a heat dissipating member 32. The metal cap 31 is attached to a socket (not shown) to receive electric power supply. The light emitting apparatus 300 also includes a fixing member 50 for fixing the light source member 10 and the light guide member 20, as will be described later.

The light source member 10 is provided with the light source parts 12 (12c, 12d, 12e, 12f, 12g) including the light sources 11 (11c, 11e, 11f, 11g) that emit light under the electric power obtained through the metal cap 31. A power supply unit (not shown) is disposed within the casing 36, and performs voltage stepping-down, rectification into a constant DC current, and pulse modulation and noise removal after rectification, for example, as the first embodiment and then supplies drive electric power to the light sources 11 through a connector 33. The light source parts 12 include one or a plurality of light sources of the same color. According to the second embodiment, LEDs of surface-mount type with the diffusion angle of 30° (directivity angle 60°) are used. The light source parts 12 are respectively provided corresponding to input surfaces as will be described later. The light source parts 12 include a first light source part 12c at the center, and a second light source part 12d, a third light source part 12e, a fourth light source part 12f, and a fifth light source part 12g which are disposed at the four corners, thus forming a cross arrangement. The first light source part 12c has two light sources 11c. The second light source part 12d has one light source 11d, the third light source part 12e has one light source 11e, the fourth light source part 12f has one light source 11f, and the fifth light source part 12g has one light source 11g. The light sources 11c use LEDs emitting white light. The light source 11d, 11e, 11f, and 11g use LEDs emitting orange light. The number of the light sources in the light source parts 12 is not particularly limited and may be one or more, and each of the light source parts 12 may have the same or different numbers of light sources. The light source member 10 may employ an organic light-emitting diode, a fluorescent tube, a cold cathode tube, a laser oscillator and the like. The color of light emitted by a visible-light emitting light source is not limited, and may be white, red, orange, yellow, green, blue, indigo, or violet, or any combinations of these colors.

As shown in FIG. 7, the light guide member 20 is configured by a combination of the first light guide member 20a and the second light guide member 20b. The material of the light guide member 20 may be the same as material according to the first embodiment. The first light guide member 20a is branched into a first extension part 201, a second extension part 202, a third extension part 203, and a fourth extension part 204 at the apex. The first light guide member 20a is formed such that the second extension part 202 and the third extension part 203 are longer than the first extension part 201 and the fourth extension part 204. Between the first extension part 201 and the second extension part 202, a first cutout portion 26c is formed. Between the second extension part 202 and the third extension part 203, a second cutout portion 26d is formed. Between the third extension part 203 and the fourth extension part 204, a third cutout portion 26e is formed. At the bottom surfaces of the first cutout portion 26c, the second cutout portion 26d, and the third cutout portion 26e, a first bottom surface portion 211, a second bottom surface portion 212, and a third bottom surface portion 213 are provided, respectively. On the left and right sides of the first to fourth extension parts 201 to 204, the following surfaces for reflecting the input light are respectively formed: a first extension part left-side surface 201a and a first extension part right-side surface 201b; a second extension part left-side surface 202a and a second extension part right-side surface 202b; a third extension part left-side surface 203a and a third extension part right-side surface 203b; and a fourth extension part left-side surface 204a and a fourth extension part right-side surface 204b. Further, the ends of the first to fourth extension parts 201 to 204 are formed in V shape through which light can be derived in wider angles. On the surface of the first light guide member 20a facing the light source member 10, a first input surface 23d, a second input surface 23c, and a third input surface 23e are formed at positions to face the corresponding light sources 11. Between the first input surface 23d and the second input surface 23c, a first recess 25c is formed. Between the second input surface 23c and the third input surface 23e, a second recess 25d is formed. On both planar surfaces of the first light guide member 20a, main surfaces 29a are formed.

On the other hand, the second light guide member 20b combined with the first light guide member 20a is branched in the same way into a fifth extension part 205, a sixth extension part 206, a seventh extension part 207, and an eighth extension part 208 at the apex. The second light guide member 20b is formed such that the sixth extension part 206 and the seventh extension part 207 are longer than the fifth extension part 205 and the eighth extension part 208. Between the fifth extension part 205 and the sixth extension part 206, a fourth cutout portion 26f is formed. Between the sixth extension part 206 and the seventh extension part 207, a fifth cutout portion 26g is formed. Between the seventh extension part 207 and the eighth extension part 208, a sixth cutout portion 26h is formed. At the bottom surfaces of the fourth cutout portion 26f, the fifth cutout portion 26g, and the sixth cutout portion 26h, a fourth bottom surface portion 214, a fifth bottom surface portion 215, and a sixth bottom surface portion 216 are provided, respectively. On the left and right sides of the fifth to eighth extension parts 205 to 208, the following surfaces for reflecting the input light are respectively formed: a fifth extension part left-side surface 205a and a fifth extension part right-side surface 205b; a sixth extension part left-side surface 206a and a sixth extension part right-side surface 206b; a seventh extension part left-side surface 207a and a seventh extension part right-side surface 207b; and an eighth extension part left-side surface 208a and an eighth extension part right-side surface 208b. Further, the apexes of the fifth to eighth extension parts 205 to 208 are formed in V shape through which the light can be derived in wider angles. On the face of the second light guide member 20b facing the light source member 10, a fourth input surface 23f and a fifth input surface 23g are formed at positions to face the corresponding light sources 11. Between the fourth input surface 23f and the fifth input surface 23g, an assembly recess 25g for assembly with the first light guide member 20a is formed. Between the assembly recess 25g and the fourth input surface 23f, a third recess 25e is formed. Between the fifth input surface 23g and the assembly recess 25g, a fourth recess 25f is formed. On both planar surfaces of the second light guide member 20b, main surfaces 29b are formed.

The light source member 10, the light guide member 20, and the casing part 36 are assembled together into the LED light bulb as described below. First, the light source member 10 connected to receive power supply through the metal cap 31 is attached to the casing part 36. The first light guide member 20a and the second light guide member 20b are then combined in the shape of a cross. Specifically, the assembly recess 25g of the second light guide member 20b is inserted into the second cutout portion 26d of the first light guide member 20a until the bottom surface of the assembly recess 25g contacts the second bottom portion 212. Then, the cross-shaped light guide member 20 with the fixing member 50 attached thereto is fixedly mounted on the casing part 36 to cover the light source member 10, thus fixing the light source member 10 and the light guide member 20.

Next, optical characteristics regarding how the light input into the light guide member 20 from the light source member 10 is diffused around will be described with reference to FIG. 8. First, a case in which the light is input into the first light guide member 20a from the light source member 10 will be described. FIG. 8 schematically illustrates the positional relationship between the first light guide member 20a and the light source member 10 as viewed from the front. It is to be noted that the conditions and the like for partial or total reflection of light may be considered similar to those described with reference to the first embodiment. Most ($\epsilon$) of the light from the second light source part 12d that is input through the first input surface 23d of the first light guide member 20a is introduced into the first extension part 201, and output through the apex of the first extension part 201.

Specifically, some of the light introduced into the first extension part 201 from the second light source part 12d travels straight (not shown) and reaches the apex of the first extension part 201, while the rest of the light is reflected multiple times between the first extension part left-side surface 201a, the first extension part right-side surface 201b, the left-side surface of the first recess 25c, and the main surfaces 29a to reach the upper end of the first extension part 201. The light is then diffused out of the upper end of the first extension part 201, irradiating the surrounding areas. Thus, the light irradiated from the second light source part 12d is guided into the first extension part 201 by the left-side surface of the first recess 25c and the first extension part right-side surface 201b as long as the light is irradiated from the second light source part 12d at any angle within 30° (within the directivity angle of 60°) with respect to the vertical direction. Accordingly, the light from the second light source part 12d can be prevented from entering the second extension part 202, the third extension part 203, or the fourth extension part 204 as much as possible.

Similarly, most (η) of the light input from the third light source part 12e through the third input surface 23e of the first light guide member 20a is introduced into the fourth extension part 204 and derived through the apex of the fourth extension part 204. In this case, the entry of the light from the third light source part 12e into the first extension part 201, the second extension part 202, or the third extension part 203 can be also prevented as much as possible by the right-side surface of the second recess 25d and the fourth extension part left-side surface 204a.

Next, the optical characteristics of the light from the first light source part 12c which is input through the second input surface 23c of the first light guide member 20a will be described. Most (ζ) of the light input from the first light source part 12c is introduced into the second extension part 202 and the third extension part 203, and is derived through the apex of the second extension part 202 and the third extension part 203. Specifically, the light introduced from the first light source part 12c is reflected multiple times between the right-side surface of the first recess 25c, the left-side surface of the second recess 25d, the second extension part right-side surface 202b, the second extension part left-side surface 202a, the third extension part right-side surface 203b, the third extension part left-side surface 203a, and the main surfaces 29a, and then reaches the apex of the second extension part 202 or the third extension part 203. The light is then diffused out of the apex and irradiates the surrounding areas. As shown in FIG. 8, the light irradiated from the first light source part 12c can be introduced into the second extension part 202 and the third extension part 203 as long as the light is irradiated at any angle within 30° (within the directivity angle of 60°) with respect to the vertical direction. Thus, the entry of the light into the first extension part 201 and the fourth extension part 204 can be prevented as much as possible.

Figure 9:
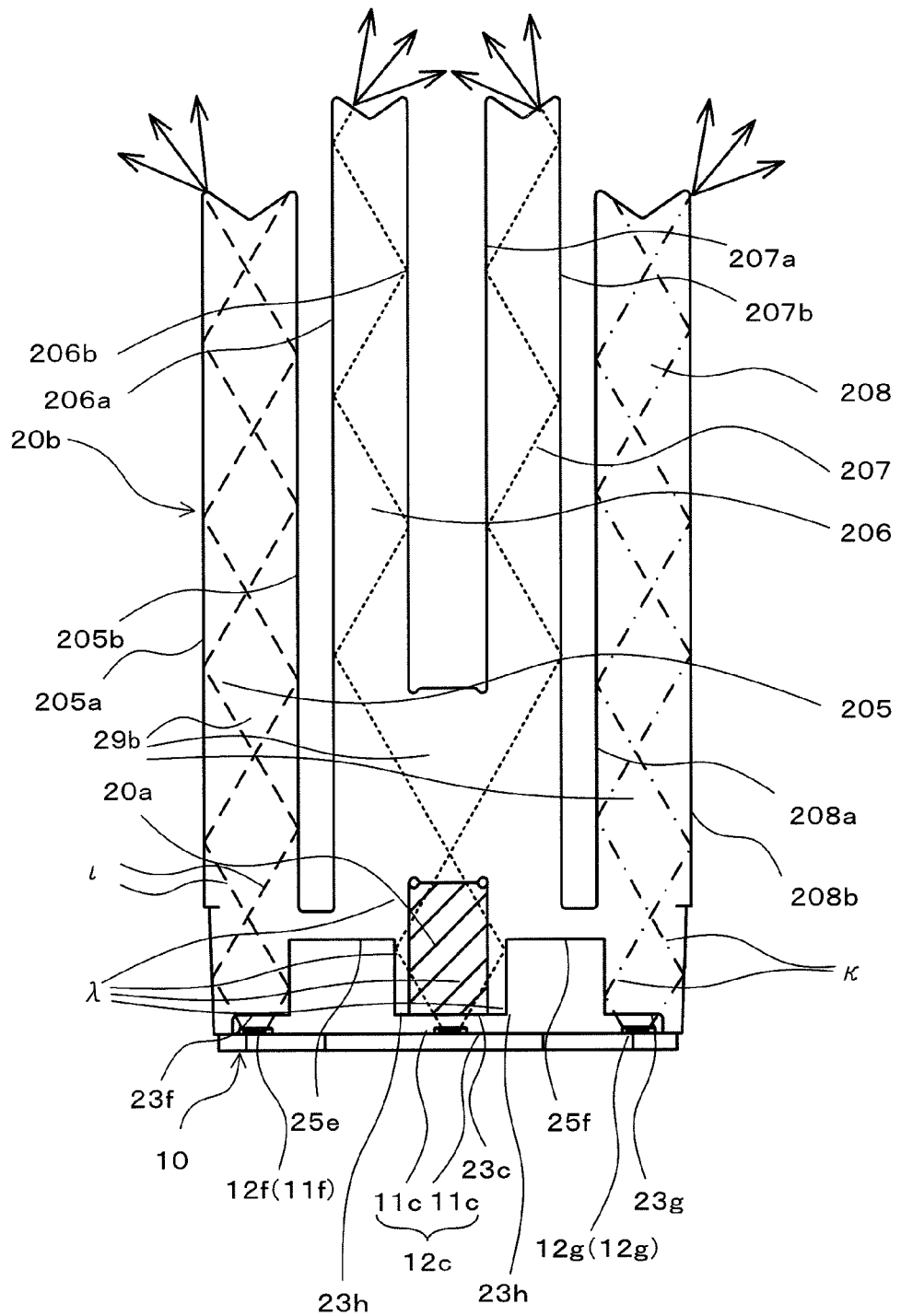
FIG. 9 schematically shows the positional relationship between a second light guide member 20b and the light source member 10 as viewed from the side.

Next, a case in which the light from the light source member 10 is input into the second light guide member 20b will be described. FIG. 9 schematically illustrates the positional relationship between the second light guide member 20b and the light source member 10 as viewed from the side. Most (ι) of the light from the fourth light source part 12f that is input through the fourth input surface 23f of the second light guide member 20b is derived through the apex of the fifth extension part 205. Specifically, some of the light introduced from the fourth light source part 12f into the fifth extension part 205 travels straight (not shown) and reaches the apex of the fifth extension part 205. The rest of the light is reflected multiple times between the fifth extension part left-side surface 205a, the fifth extension part right-side surface 205b, the left-side surface of the third recess 25e, and the main surfaces 29b, and then reaches the apex of the fifth extension part 205. The light is then diffused out of the upper end of the fifth extension part 205 and irradiates the surrounding areas. As shown in FIG. 9, the light irradiated from the fourth light source part 12f is guided into the fifth extension part 205 by the left-side surface of the third recess 25e and the fifth extension part right-side surface 205b as long as the light is irradiated at any angle within 30° (within the directivity angle of 60°) with respect to the vertical direction. Thus, the light from the fourth light source part 12f can be prevented from being introduced into the sixth extension part 206, the seventh extension part 207, or the eighth extension part 208 as much as possible.

Similarly, most (κ) of the light from the fifth light source part 12g input through the fifth input surface 23g of the second light guide member 20b is introduced into the eighth extension part 208, and is derived through the apex of the eighth extension part 208. The light from the fifth light source part 12g can be prevented in the same way from being introduced into the fifth extension part 205, the sixth extension part 206, or the seventh extension part 207 as much as possible by the right-side surface of the fourth recess 25f and the eighth extension part left-side surface 208a.

Next, the optical characteristics in the case of the light input from the first light source part 12c will be described. Most (λ) of the light from the first light source part 12c is input into the second input surface 23c of the first light guide member 20a and then introduced into the sixth extension part 206 and the seventh extension part 207. Some of the light is introduced through sixth input surfaces 23h formed adjacent to the second input surface 23c, and is derived through the apexes of the sixth extension part 206 and the seventh extension part 207. Specifically, the light introduced from the first light source part 12c is reflected multiple times between the right-side surface of the third recess 25e, the left-side surface of the fourth recess 25f, the sixth extension part right-side surface 206b, the sixth extension part left-side surface 206a, the seventh extension part right-side surface 207b, the seventh extension part left-side surface 207a, and the main surfaces 29b, and then reaches the apex of the sixth extension part 206 or the seventh extension part 207. The light is then diffused out of the apex, and irradiates the surrounding areas. As shown in FIG. 9, the light irradiated from the first light source part 12c is introduced into the sixth extension part 206 and the seventh extension part 207 as long as the light is irradiated at any angle within 30°. Thus, the light can be prevented from being introduced into the fifth extension part 205 or the eighth extension part 208 as much as possible.

Because of the optical characteristics of the first light guide member 20a and the second light guide member 20b as described above, the light from the first light source part 12c is guided mainly into the second extension part 202, the third extension part 203, the sixth extension part 206, and the seventh extension part 207, thereby emitting the color of the light from the light sources 11c. The light from the second light source part 12d is introduced into the first extension part 201, emitting the color of the light from the light source 11d. The light from the third light source part 12e is introduced into the fourth extension part 204, emitting the color of the light from the light source 11e. The light from the fourth light source part 12f is introduced into the fifth extension part 205, emitting the color of the light from the light source 11*f*. The light from the fifth light source part 12*g* is introduced into the eighth extension part 208, emitting the color of the light from the light source 11*g*. Thus, the color of light derived from the respective extension parts can be varied in accordance with the color of light from each light source part. According to the second embodiment, the second extension part 202, the third extension part 203, the sixth extension part 206, and the seventh extension part 207 irradiate white light, while the first extension part 201, the fourth extension part 204, the fifth extension part 205, and the eighth extension part 208 irradiate orange light.

The present invention is not limited to the foregoing embodiments, and various modifications or improvements can be made without departing from the spirit or scope of the present invention. For example, the following modifications may be made.

Figure 10:
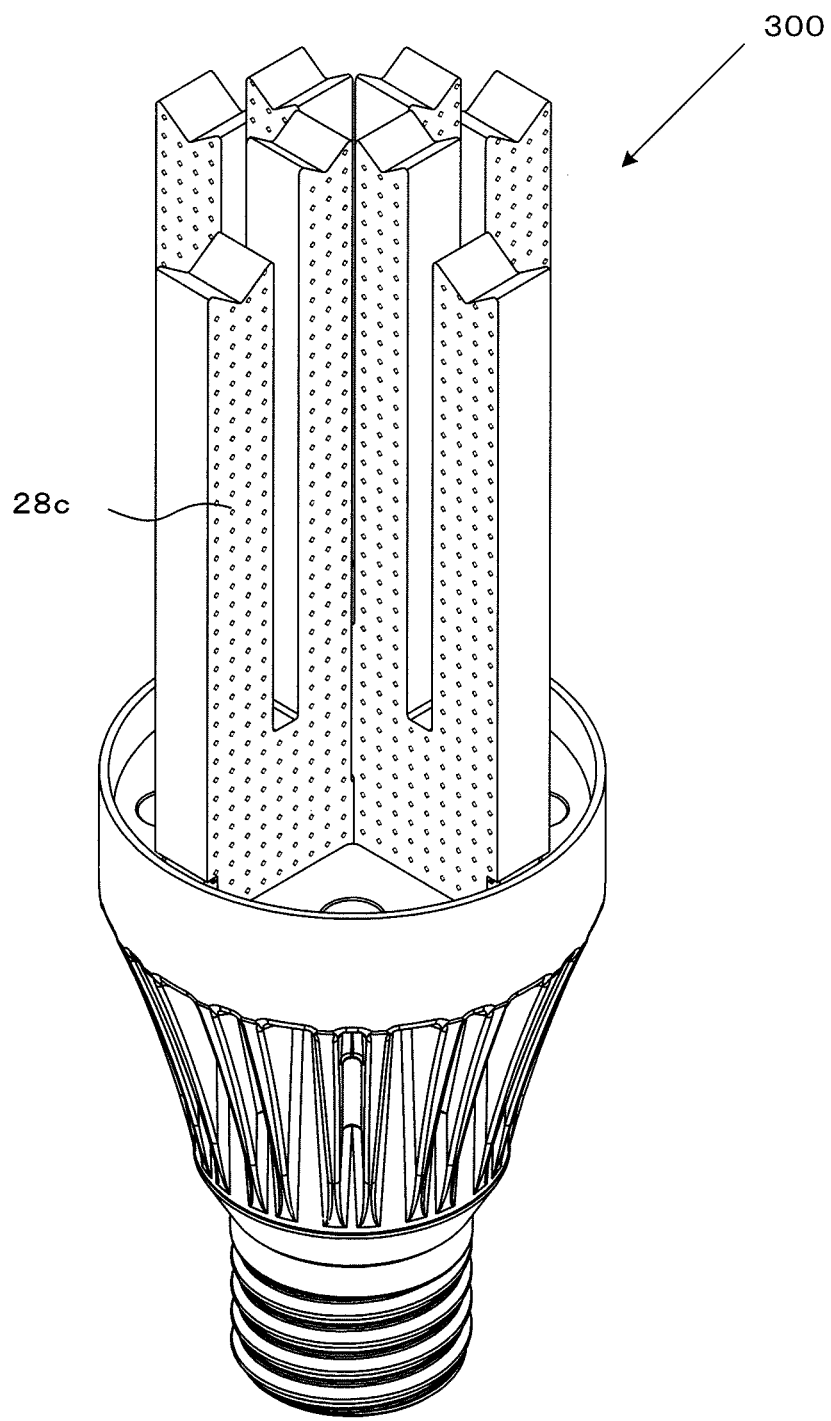
FIG. 10 is a perspective view of another embodiment of the light emitting apparatus 300 according to the second embodiment.

While according to the second embodiment the main surfaces 29*a* and 29*b* and the side surfaces of the light guide member 20 have smooth surfaces, the present invention is not limited to such an example. However, as in a modification of the first embodiment and as shown in FIG. 10, on the main surfaces on both sides of the light guide member 20, diffusing dots 28*c* of diffusing recesses or diffusing protrusions may be formed for deriving the light input from the light source parts 12 through the input surfaces of the light guide member 20 in the form of diffused light. By adopting such a configuration, the colors of the light sources can be reflected on the main surfaces, while the respective extension parts can emit the colors of the corresponding light sources, whereby the light emitting apparatus 300 can be aesthetically improved. The form of the diffusing dots 28*c* may be similar to those of the modification of the first embodiment.

While according to the second embodiment basically all of the light from the light source parts is prevented from entering the adjacent extension part in order to prevent the mixing of light, the present invention is not limited to such an example. Entry of light may be permitted to some extent as long as the color difference between the adjacent extension parts can be recognized.

Figure 11:
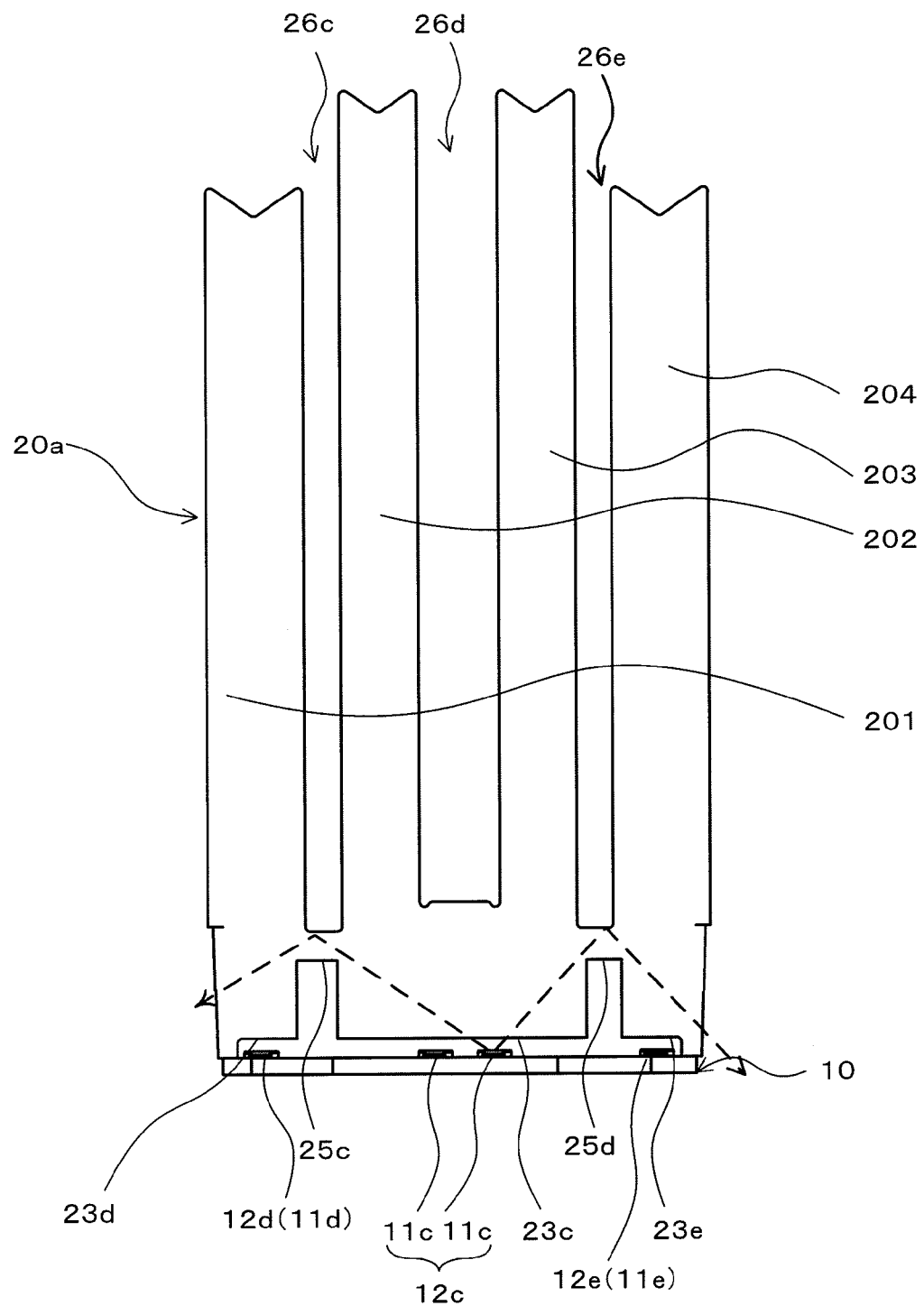
FIG. 11 is a front view of another embodiment of recesses (25c, 25d) and cutout portions (26c, 26d, 26e) of the light emitting apparatus 300 according to the second embodiment.

Further, as shown in FIG. 11, for example, the light from the first light source part 12*c* may be configured to be output to the outside without entering the first extension part 201 or the fourth extension part 204 after passing between the bottom surface of the first cutout portion 26*c* and the first recess 25*c* or between the bottom surface of the third cutout portion 26*e* and the second recess 25*d*. By adopting such a configuration, the entry of the light from the first light source part 12*c* into the first extension part 201 or the fourth extension part 204 and the resultant mixing with the light from the second light source part 12*d* or the third light source part 12*e* can be decreased.

Figure 12:
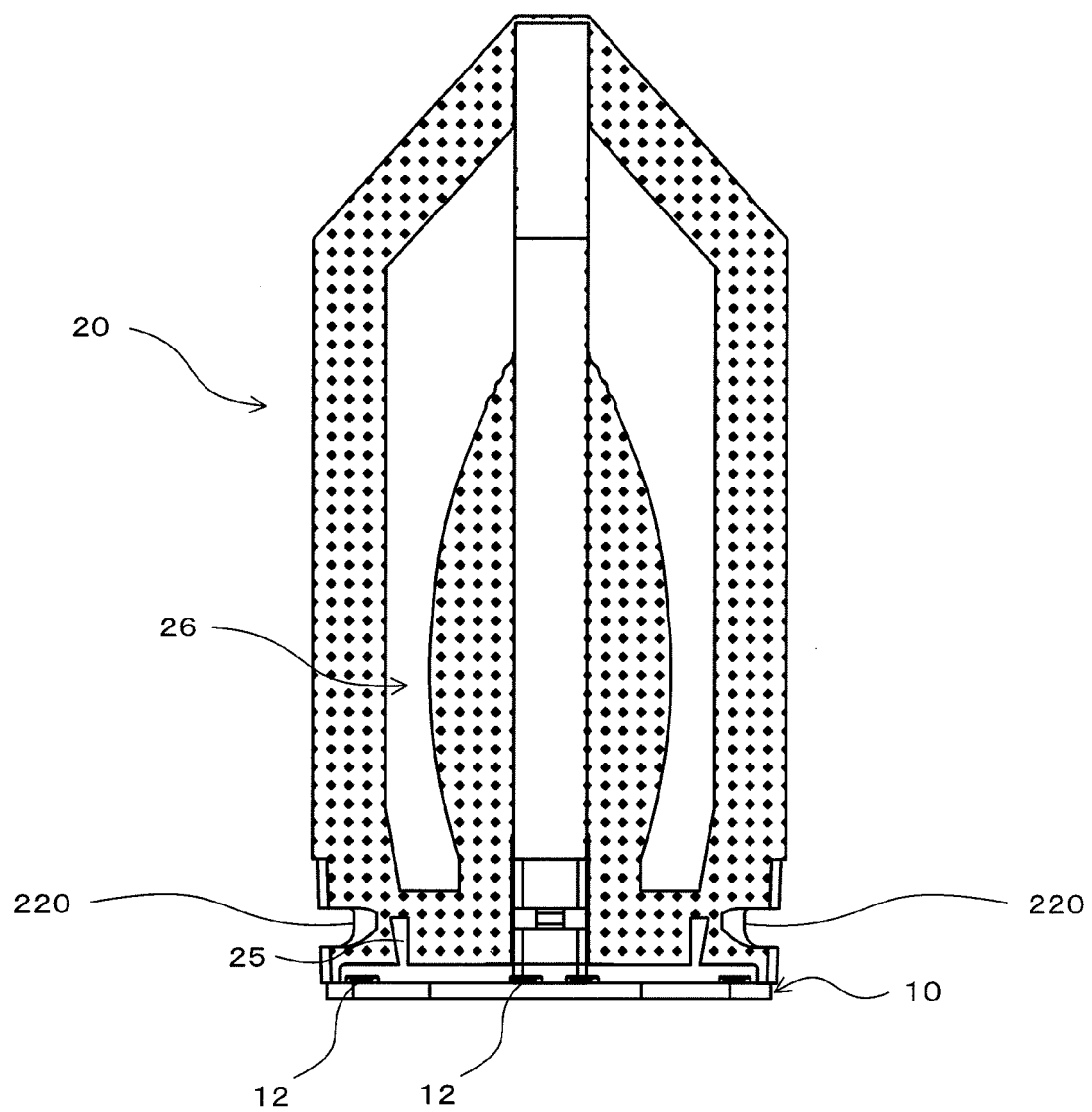
FIG. 12 is a front view of the light guide member 20 according to another embodiment of the light emitting apparatus 300 according to the second embodiment.

According to the second embodiment, as shown in FIG. 8, a lower portion of the first extension part left-side surface 201*a* and a lower portion of the fourth extension part right-side surface 204*b* are formed in flat surfaces. Further, as shown in FIG. 9, lower portions of the fifth extension part left-side surface 205*a* and the eighth extension part right-side surface 208*b* are formed in flat surfaces. However, these surfaces are not necessarily formed in flat surfaces. For example, as shown in FIG. 12, recesses 220 may be formed to fit with the fixing member 50.

According to the second embodiment, the cutout portions 26 are straight and the recesses 25 are cuboid. However, according to the present invention, the propagation direction of light from the light source part can be adjusted depending on the size or shape of the cutout portion 26, the width or height of the recess 25, the angle of the recess side surfaces with respect to the light source parts 12, or the interval between the cutout portion 26 and the recess 25, for example. Thus, by adjusting these values as needed, a desired direction of optical reflection can be obtained. For example, as shown in FIG. 12, the cutout portion 26 may be curved instead of being straight, and the recess 25 maybe a groove. The side surfaces of the recess 25 may be formed at angles of more or less than 90° with respect to the light source member 10 in consideration of the direction of light from the light source parts 12 or the direction in which the light is to be diffused, for example.

According to the second embodiment, the light sources employ LEDs that are diffused on both sides at 30° with respect to the vertical direction (directivity angle 60°). However, the diffusion angle is not particularly limited to the above, and LEDs that are diffused on both sides in a range of 5° to 60° with respect to the vertical direction (with directivity angle 10° to 120°) maybe used to the extent that the difference in the color of light between the respective extension parts can be recognized.

According to the second embodiment, the light sources 11*c* are LEDs emitting white light, while the light sources 11*d*, 11*e*, 11*f*, and 11*g* are LEDs each emitting orange light. However, the present invention is not limited to the above. For example, all the light sources may have different colors of light with each other.

The technical concepts that may be grasped from the foregoing embodiments and other examples as well as their effects will be described below. The present invention enables the output of light of different wavelengths or colors depending on the parts of the light guide member by minimizing the degree with which light from adjacent light source parts outputting different wavelengths or colors is mixed within the light guide member.

In order to achieve the above, a light emitting apparatus according to the present invention includes a light source member having a plurality of light source parts each with one or more light sources that output light of an arbitrary wavelength ranging from 20 nm to 1 mm under external power supply; and a light guide member having input surfaces through which the light from the light source member is input and another end surface through which the input light is output. In the light emitting apparatus according to the present invention, the adjacent light source parts of the light source member output light of different wavelengths, and the light guide member includes a recess formed between the respective input surfaces through which the light from the corresponding light source parts is input and having a recess side surface that reflects at least some of the light input through the input surfaces; a plurality of extension parts that respectively guide mainly the light input through the input surfaces from the corresponding light source parts; and a cutout portion formed between the extension parts. Another light emitting apparatus according to the present invention includes a light source member having a plurality of light source parts each with one or more light sources that emit visible light under external power supply; and a light guide member having input surfaces through which the light from the light source member is input and other end surfaces through which the input light is output. In the light emitting apparatus, the adjacent light source parts of the light source member emit light of different colors, and the light guide member includes a recess formed between the respective input surfaces through which the light from the corresponding light source parts is input and having a recess side surface that reflects at least some of the light input through the input surfaces; a plurality of extension parts that respectively guide mainly the light input through the input surfaces from the corresponding light source parts; and a cutout portion formed between the extension parts.

In the light emitting apparatus according to the present invention, the light guide member has the recess on the input surface side, the cutout portion on the output surface side, and the independent extension parts. Thus, the light input from the light source parts can be prevented from entering the adjacent extension part as much as possible by the side surfaces of the recess or the side surfaces of the extension parts, whereby the likelihood of mixing of light between the adjacent light source parts can be decreased.

The main surfaces may include diffusing dots or diffusing grooves for deriving the light from the light source parts as diffused light. By forming the diffusing dots or grooves, the light from the light source parts can also be output through the main surfaces. Further, the diffusing dot on the main surface enables the color of the light from the light source parts to be recognized, so that the light emitting apparatus with a colorful and aesthetically superior light guide member can be provided. The diffusing dots or the diffusing grooves may be provided on side surfaces.

Further, the recess side surface may be formed vertically with respect to the input surface. By forming the recess side surface vertically, the light received from the light source parts can be reflected at the same angle and guided into the extension parts, and the designing of the light guide member can be facilitated.

The recess side surface may be formed at an angle of more or less than 90° with respect to the input surface adjacent to the recess side surface. By adjusting the angle of the recess side surface, the amount of light introduced into the extension parts can be adjusted. Thus, optical amount adjustment and the like can be facilitated.

The angle defined between the recess side surface and the adjacent input surface maybe configured such that the light from the corresponding light source part can be totally reflected. By adopting such a configuration, the light can be prevented from passing through the recess and being introduced into the adjacent extension part, whereby the mixing of the light with the light from the adjacent light source part can be decreased.

The light guide member maybe made of acrylic resin, and the angle of the light input from the light source on the recess side surface may be not less than 42°. Because the critical angle of acrylic resin is approximately 42.1°, the light from the light source part can be totally reflected by the recess side surface by setting the angle of incidence of the light from the light source at not less than 42°. Thus, the mixing of the light with the light from the adjacent light source part can be decreased.

The recess and the cutout portion may be disposed such that the light from the light source parts does not pass between the recess and the cutout portion. Thus, the light can be further prevented from entering the adjacent extension part.

INDUSTRIAL APPLICABILITY

As described with reference to the foregoing embodiments, the present invention can be utilized as a light emitting apparatus.

DESCRIPTION OF REFERENCE NUMERALS

10: Light source member
11, 11a, 11b, 11c, 11d, 11e, 11f, 11g: Light source
12: Light source part
12a: Left-side light source part
12b: Right-side light source part
12c: First light source part
12d: Second light source part
12e: Third light source part
12f: Fourth light source part
12g: Fifth light source part
13: Power supply cord
15: Board
20: Light guide member
20a: First light guide member
20b: Second light guide member
21: Light source part
22a: Left-side outer surface
22b: Right-side outer surface
23a: Left-side input surface
23b: Right-side input surface
23c: Second input surface
23d: First input surface
23e: Third input surface
23f: Fourth input surface
23g: Fifth input surface
24a: Left-side output surface
24b: Right-side output surface
25: Recess
25a: Recess left-side surface
25b: Recess right-side surface
25c: First recess
25d: Second recess
25e: Third recess
25f: Fourth recess
25g: Assembly recess
26: Cutout portion
26a: Left-side cutout-side surface
26c: First cutout portion
26d: Second cutout portion
26e: Third cutout portion
26f: Fourth cutout portion
26g: Fifth cutout portion
26h: Sixth cutout portion
28: Diffusing dot
28a: First diffusing dot
28b: Second diffusing dot
29: Main surface
29a: Main surface
29b: Main surface
30: C-shaped steel
31: Metal cap
32: Heat dissipating member
33: Connector
35: Holder member
36: Casing part
50: Fixing member
100: Light emitting apparatus
101: Left-side extension part
101a: Right-side surface
102b: Left-side surface
102: Right-side extension part
201: First extension part
201a: First extension part left-side surface
201b: First extension part right-side surface
202: Second extension part
202a: Second extension part left-side surface
202b: Second extension part right-side surface
203: Third extension part
203a: Third extension part left-side surface 203b: Third extension part right-side surface
204: Fourth extension part
204a: Fourth extension part left-side surface
204b: Fourth extension part right-side surface
205: Fifth extension part
205a: Fifth extension part left-side surface
205b: Fifth extension part right-side surface
206: Sixth extension part
206a: Sixth extension part left-side surface
206b: Sixth extension part right-side surface
207: Seventh extension part
207a: Seventh extension part left-side surface
207b: Seventh extension part right-side surface
208: Eighth extension part
208a: Eighth extension part left-side surface
208b: Eighth extension part right-side surface
211: First bottom surface portion
212: Second bottom surface portion
213: Third bottom surface portion
214: Fourth bottom surface portion
215: Fifth bottom surface portion
216: Sixth bottom surface portion
300: Light emitting apparatus

The invention claimed is:

1. A light emitting apparatus comprising:
a light source member having a plurality of light source parts each with one or more light sources that output light of an arbitrary wavelength ranging from 20 nm to 1 mm under external power supply; and
a light guide member having input surfaces through which the light from the light source member is input and other end surfaces through which the input light is output,
wherein:
the adjacent light source parts of the light source member output light of different wavelengths;
the light guide member includes a recess formed at an upper position with respect to the light source member and between the respective input surfaces through which the light from the corresponding light source parts is input, the recess having a recess upper horizontal surface and a recess side surface substantially vertical with respect to the recess upper horizontal surface that reflects at least some of the light input through the input surfaces, a plurality of extension parts that respectively guide mainly the light input through the input surfaces from the corresponding light source parts, and a cutout portion formed between the extension parts, and
the recess is formed at the opposite side of the light guide member from the cutout portion with a portion of the light guide member between the recess and the cutout portion, and the recess and the cutout portion are disposed such that the light from the light source parts does not pass directly through the portion of the light guide member between the recess and the cutout portion.

2. The light emitting apparatus according to claim 1, wherein main surfaces of the light guide member include diffusing dots or diffusing grooves for deriving the light from the light source parts as diffused light.

3. The light emitting apparatus according to claim 1, wherein the recess side surface is formed vertically with respect to the input surface.

4. The light emitting apparatus according to claim 1, wherein the recess side surface is formed at an angle of less than 90° with respect to the input surface adjacent to the recess side surface.

5. The light emitting apparatus according to claim 1, wherein the recess side surface is formed at an angle of more than 90° with respect to the input surface adjacent to the recess side surface.

6. The light emitting apparatus according to claim 1, wherein the angle defined between the recess side surface and the adjacent input surface is configured such that the light from the corresponding light source part can be totally reflected.

7. The light emitting apparatus according to claim 1, wherein:
the light guide member is made of acrylic resin; and
the angle of the light input from the light source on the recess side surface is not less than 42°.

8. A light emitting apparatus comprising:
a light source member having a plurality of light source parts each with one or more light sources that emit visible light under external power supply; and
a light guide member having an input surface through which the light from the light source member is input and other end surfaces through which the input light is output,
wherein:
the adjacent light source parts of the light source member emit light of different colors;
the light guide member includes a recess formed at an upper position with respect to the light source member and between the respective input surfaces through which the light from the corresponding light source parts is input, the recess having a recess upper horizontal surface and a recess side surface substantially vertical with respect to the recess upper horizontal surface that reflects at least some of the light input through the input surfaces, a plurality of extension parts that respectively guide mainly the light input through the input surfaces from the corresponding light source parts, and a cutout portion formed between the extension parts, and
the recess is formed at the opposite side of the light guide member from the cutout portion with a portion of the light guide member between the recess and the cutout portion, and the recess and the cutout portion are disposed such that the light from the light source parts does not pass directly through the portion of the light guide member between the recess and the cutout portion.

9. The light emitting apparatus according to claim 8, wherein main surfaces of the light guide member include diffusing dots or diffusing grooves for deriving the light from the light source parts as diffused light.

10. The light emitting apparatus according to claim 8, wherein the recess side surface is formed vertically with respect to the input surface.

11. The light emitting apparatus according to claim 8, wherein the recess side surface is formed at an angle of less than 90° with respect to the input surface adjacent to the recess side surface.

12. The light emitting apparatus according to claim 8, wherein the recess side surface is formed at an angle of more than 90° with respect to the input surface adjacent to the recess side surface.

13. The light emitting apparatus according to claim 8, wherein the angle defined between the recess side surface and the adjacent input surface is configured such that the light from the corresponding light source part can be totally reflected.

14. The light emitting apparatus according to claim 8, wherein:
   the light guide member is made of acrylic resin; and
   the angle of the light input from the light source on the recess side surface is not less than 42°.

\* \* \* \* \*